US006376070B1

(12) United States Patent
Nakasuga et al.

(10) Patent No.: US 6,376,070 B1
(45) Date of Patent: *Apr. 23, 2002

(54) SHEET-FORM, CURABLE PRESSURE-SENSITIVE ADHESIVE

(75) Inventors: Akira Nakasuga, Uji; Hiroji Fukui, Kyoto, both of (JP)

(73) Assignee: Sekisui Kagaku Kogyo Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,005

(22) Filed: May 21, 1997

(30) Foreign Application Priority Data

| Jul. 15, 1996 | (JP) | 8-184639 |
| Feb. 4, 1997 | (JP) | 9-021290 |
| May 8, 1997 | (JP) | 9-118052 |

(51) Int. Cl.[7] ............... C09J 7/02; C08J 5/18; C08G 59/00
(52) U.S. Cl. ............... 428/355 EP; 428/345; 428/355 AC
(58) Field of Search ............... 428/355 AC, 355 EP, 428/345

(56) References Cited

U.S. PATENT DOCUMENTS 4,612,209 A * 9/1986 Forgo
4,695,508 A * 9/1987 Kageyama
5,086,088 A   2/1992 Kitano et al.

FOREIGN PATENT DOCUMENTS

| EP | 0150674 | * | 12/1984 |
| EP | 0386909 | * | 9/1990 |
| JP | 58-138766 A | | 8/1983 |
| JP | 1-185383 A | | 7/1989 |
| JP | 2-272076 | | 11/1990 |
| JP | 4-300981 A | | 10/1992 |
| JP | 5-78639 A | | 3/1993 |
| JP | 5-506465 | | 9/1993 |
| JP | 6-287524 A | | 10/1994 |
| JP | 8-20756 A | | 1/1996 |
| JP | 9-279103 | | 10/1997 |
| JP | 10-508636 | | 8/1998 |
| WO | WO 91/16387 | | 10/1991 |

OTHER PUBLICATIONS

Skeist, "Epoxy Resin Adhesives: Chemistry" Handbook of Adhesives; 1977, p. 435.*

* cited by examiner

*Primary Examiner*—Daniel Zirker
(74) *Attorney, Agent, or Firm*—Armstrong, Westerman & Hattori, LLP

(57) ABSTRACT

A sheet-form, curable pressure-sensitive adhesive is disclosed which includes a high molecular weight polymer (A) such as an acrylic polymer for constituting a pressure-sensitive adhesive component, a compound (B) containing an epoxy group, and a polymerization initiator (C) which is activated upon application of an activation energy such as a light to cause the compound (B) having an epoxy group to undergo a ring-opening polymerization.

11 Claims, No Drawings

SHEET-FORM, CURABLE PRESSURE-SENSITIVE ADHESIVE

BACKGROUND OF THE INVENTION

1. Field of the Invention

The present invention relates to a sheet-form, curable pressure-sensitive adhesive, and more particularly to a sheet-form, curable pressure-sensitive adhesive which is sufficiently tacky to be adhered to an adherend and also has the ability to cure upon application of an activation energy thereto, either before or after the adherend is combined with another adherend therethrough.

2. Background Art

Acrylic pressure-sensitive adhesives have been widely used in a variety of pressure-sensitive adhesive-carrying products including pressure-sensitive adhesive tapes due to their excellent properties such as resistance to heat, environment and oils. The general design of such acrylic pressure-sensitive adhesives controls their elastic modulus to a reduced level to develop pressure-sensitive adhesive strength thereof. Accordingly, acrylic pressure-sensitive adhesives, in turn, are difficult to develop their adhesive strength to a higher level as regular adhesives exhibit. This prevents their use in applications requiring a high joint strength, as for joining steels for vehicles, housing or building structural members, or casing members.

Under such circumstances, a curable pressure-sensitive adhesive has been proposed which provides a good operational characteristics and is safe due to absence of volatile contents while capable of providing high levels of joint strength and film toughness as comparable to those of regular adhesives. For example, Japanese Patent Laying-open No. Hei 2-272076 discloses an adhesive tape which utilizes a curable pressure-sensitive adhesive having a composition containing an acrylate monomer and an epoxy resin. Among the photopolymerizable compositions, the acrylate monomer alone is polymerized to provide the pressure-sensitive adhesive tape. For the purpose of enhancing its adhesion strength, the epoxy resin is heat cured after the pressure-sensitive adhesive tape is adhered to an adherend.

However, the method disclosed in the Japanese Patent Laying-open No. Hei 2-272076 utilizes heat for curing the epoxy resin. This prevents the use of materials having a poor heat resistance as the adherend, resulting in imposing limitations upon material selection of the adherend.

Japanese Patent Kohyo No. Hei 5-506465 discloses a pressure-sensitive adhesive which has a composition including a radically photopolymerizable component such as an acrylate monomer, cationically photopolymerizable component such as an epoxy compound and an organometallic complex salt polymerization initiator. This pressure-sensitive adhesive has been proposed in an attempt to enhance tackiness thereof. Both of radical and cationic photopolymerizations proceed during the stages of manufacturing said pressure-sensitive adhesive and complete by the time when the pressure-sensitive adhesive is formed into a sheet form. That is, an adequate strength has been given to the thus obtained pressure-sensitive adhesive before it is adhered to an adherend. Accordingly, while the pressure-sensitive adhesive is sufficiently tacky to adhere to the adherend, the application of an external stimulation such as heat or radiation thereto contributes no further improvement in adhesion strength.

On the other hand, epoxy resin adhesives exhibit excellent physical and chemical properties including creep resistance, light resistance, water resistance, heat resistance and chemical resistance. In addition, they provide high adhesion strength and have the ability to adhere to a wide range of materials such as metals, plastics and glasses. All of the above have led to a wide-spread use of the epoxy resin adhesives when joining various material members each other.

However, the general use of those epoxy resin adhesives in liquid form disadvantageously results in uneven coating and edge flowing derived from excessive application thereof to provide a poor appearance at joint interface edges, and prevents repeated application thereof onto once applied surface. Also, the typical epoxy resin adhesives are of two-part type so that a mixing ratio of a base resin to a curing agent is limited to a narrow range. Accordingly, care must be taken in order to mix them in appropriate proportions. The failure to do so is likely to prevent the prepared adhesives from exhibiting a purposed adhesive strength.

In view of the above, a proposal has been made to provide a sheet-form epoxy resin adhesive wherein the epoxy resin adhesive is formed into a sheet or film (Japanese Patent Laying-open No. Sho 60-173076). A sheet-form epoxy resin adhesive however has a high elastic modulus in its ordinary state to exhibit a low initial tackiness. This causes problems that the sheet-form epoxy resin adhesive is unable to provide adequate tackiness and satisfactory operational characteristics when joining adherends. Furthermore, the insufficient adherence thereof to an adherend is inevitably followed by severe conditions such as an elevated temperature and/or pressing under high-pressure to insure complete adhesion to the adherend. Such severe processing conditions prohibit the application of the disclosed adhesive to otherwise tolerable adherends.

SUMMARY OF THE INVENTION

An object of the present invention is to provide a sheet-form, curable pressure-sensitive adhesive which has an adequate initial tackiness, and is capable of being cured upon application of an activation energy thereto and also of being used for joining members having insufficient heat resistances while eliminating the necessities of additional severe conditions such as an elevated temperature and/or pressing under high pressure when applied to an adherend.

Another object of the present invention is to provide a method for joining members which utilizes the above sheet-form, curable pressure-sensitive adhesive.

In accordance with the present invention, a sheet-form, curable pressure-sensitive adhesive is provided which comprises a composition including (A) a high molecular weight polymer, (B) a compound containing an epoxy group and (C) a polymerization initiator which, when an activation energy is applied thereto, initiates the compound (B) to undergo a ring-opening polymerization. In the sheet-form, curable pressure-sensitive adhesive, the high molecular weight polymer (A) has an adequate initial cohesive strength and is sufficiently tacky to readily adhere to an adherend. Also, the application of the activation energy activates the polymerization initiator (C) which causes the ring-opening polymerization of the compound (B) to take place. As a result, the sheet-form adhesive is cured to provide a satisfactory adhesion strength.

Furthermore, since the curing caused by application of the energy does not progress rapidly, the adequate tackiness of the sheet-form, curable pressure-sensitive adhesive enables an easy adherence thereof to the adherend even after the energy application.

The present invention is explained in more detail below.

The High Molecular Weight Polymer (A)

The high molecular weight polymer (A) used in the present invention is added to provide the sheet-form, curable pressure-sensitive adhesive with tackiness in its ordinary state. Any high molecular weight polymers may be used as the polymer (A), as long as they have the ability to impart tackiness and are sufficiently compatible with the compound (B) and the polymerization initiator (C).

Examples of the high molecular weight polymer (A) include acrylic polymers, polyesters, polyurethanes, silicones, polyethers, polycarbonates, poly(vinyl ether)s, poly(vinyl chloride)s, poly(vinyl acetate)s, ethylene-vinyl acetate copolymers, polyisobutylene. Of the above, acrylic polymers are preferably used since they have the ability to utilize a radical photopolymerization reaction as described hereinafter, the excellent compatibility with the compound (B) containing an epoxy group, the excellent tack properties and the others.

Although any particular limitations are not imposed upon a molecular weight of the above high molecular weight polymer, it preferably has a relatively higher molecular weight. The preferred high molecular weight polymer has a weight average molecular weight of from 0.2 millions to 5 millions. If the weight average molecular weight is below 0.2 millions, the cohesive strength of the sheet-form, curable pressure-sensitive adhesive is reduced to possibly cause webbing or peeling when applied. If the weight average molecular weight exceeds 5 millions, an increase in viscosity of the composition including the high molecular weight polymer and the compound containing an epoxy group is caused to possibly prevent sheet-forming of the composition.

The high molecular weight polymer can have various structures, examples of which include, but not limited to, a monopolymer structure, a random copolymer structure, a block copolymer structure, an alternating copolymer structure, a stereoregular structure, a multi-branched structure, a multi-armed structure, a star structure, a tree structure, a ladder structure, a cyclic structure, a helix structure and the others.

As described above, preferable for use as the high molecular weight polymer are acrylic polymers. Among the acrylic polymers, a copolymer obtainable by copolymerizing a compound containing a (meth)acryloyl group with a copolymerizable monomer copolymerizable therewith is more preferred.

Examples of such compound containing a (meth)acryloyl group include methyl (meth)acrylates, ethyl (meth)acrylates, n-butyl (meth)acrylates, tert-butyl (meth)acrylates, 2-ethylhexyl (meth)acrylates, cyclohexyl (meth)acrylates, n-octyl (meth)acrylates, isooctyl (meth)acrylates, isononyl (meth)acrylates, isomyristyl (meth)acrylates, isobornyl (meth)acrylates, benzyl (meth)acrylates.

The term "(meth)acrylates" as used herein is intended to mean "acrylate" or "methacrylate".

More preferable for use as the compound containing a (meth)acryloyl group is a compound which contains at least one (meth)acryloyl group and at least one hydroxyl group per molecule. Illustrative of such a compound containing one or more (meth)acryloyl groups and one or more hydroxyl groups per molecule are 2-hydroxyethyl (meth) acrylates, 3-hydroxypropyl (meth)acrylates, 2-hydroxypropyl (meth)acrylates, 4-hydroxybutyl (meth) acrylates, 2-hydroxybutyl (meth)acrylates, 5-hydroxypentyl (meth)acrylates, 6-hydroxyhexyl (meth)acrylates, 3-hydroxy-3-methylbutyl (meth)acrylates, 2-hydroxy-3-phenoxypropyl (meth)acrylates, pentaerythritol tri(meth) acrylates, 2-[(meth)acryloyloxy]ethyl-2-hydroxyethyl phthalic acids, 2-[(meth)acryloyloxy]ethyl-2-hydroxypropyl phthalic acids, and the following compounds (1) through (10):

$CH_2=CH.C(O)O.CH_2CH_2O.[C(O)CH_2CH_2CH_2CH_2CH_2O]n.H$ (n=1–10)    [Compound 1]

$CH_2=C(CH_3).C(O)O.CH_2CH_2O.[C(O)CH_2CH_2CH_2CH_2CH_2O]$ n.H (n=1–10)    [Compound 2]

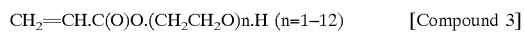
$CH_2=CH.C(O)O.(CH_2CH_2O)n.H$ (n=1–12)    [Compound 3]

$CH_2=C(CH_3).C(O)O.(CH_2CH_2O)n.H$ (n=1–12)    [Compound 4]

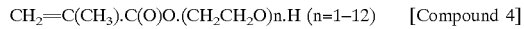
$CH_2=CH.C(O)O.[CH_2CH(CH_3)O]n.H$ (n=1–12)    [Compound 5]

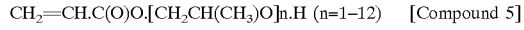
$CH_2=C(CH_3).C(O)O.[CH_2CH(CH_3)O]n.H$ (n=1–12)[Compound 6]

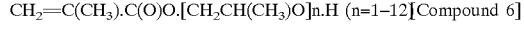
$CH_2=C(CH_3).C(O)O.(CH_2CH_2O)n.[CH_2CH(CH_3)O]m.H$(n=1–12, m=1–10)    [Compound 7]

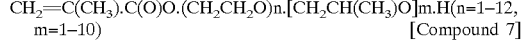
$CH_2=CH.C(O)O.(CH_2CH_2O)n.[CH_2CH(CH_3)O]m.H$ (n=1–12, m=1–10)    [Compound 8]

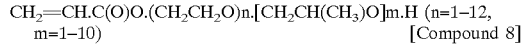
$CH_2=C(CH_3).C(O)O.(CH_2CH_2O)n.(CH_2CH_2CH_2CH_2O)$ mH(n=1–12, m=1–10)    [Compound 9]

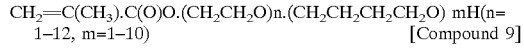
$CH_2=CH.C(O)O.(CH_2CH_2O)n.(CH_2CH_2CH_2CH_2O)mH$ (n=1–12, m=1–10)    [Compound 10]

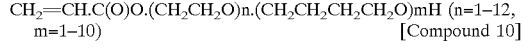
of the above, the compounds (1) through (10) as above-specified by structural formulas are preferably used since they are capable of imparting a high level of adhesiveness to the resulting sheet-form, curable pressure-sensitive adhesive.

Any compounds cab be used as the above copolymerizable monomer, as long as they have an unsaturated bond to be copolymerizable with the compounds containing a (meth) acryloyl group. For the purpose of enhancing storage stability of the sheet-form, curable pressure-sensitive adhesive, the use of a compound which is non-reactive with the epoxy group contained in the sheet-form, curable pressure-sensitive adhesive is preferred.

In view of the above, it is not preferred to use, as the copolymerizable monomer, vinyl monomers having an acid anhydrous skeletone which include carboxyl-containing vinyl monomers such as acrylic acid and methacrylic acid, and maleic anhydrides.

Examples of applicable copolymerizable monomers include methyl (meth)acrylates, ethyl (meth)acrylates, propyl (meth)acrylates, n-butyl (meth)acrylates, tert-butyl (meth)acrylates, cyclohexyl (meth)acrylates, 2-ethylhexyl (meth)acrylates, n-octyl (meth)acrylates, isooctyl (meth) acrylates, isononyl (meth)acrylates, isomyristyl (meth) acrylates, stearyl (meth)acrylates, isobornyl (meth)acrylates, benzyl (meth)acrylates, 2-butoxyethyl (meth)acrylates, 2-phenoxyethyl (meth)acrylates, glycidyl (meth)acrylates, tetrahydrofurfuryl (meth)acrylates, hexandiol di(meth) acrylates, ethylene glycol di(meth)acrylates, polyethylene glycol di(meth)acrylates, propylene glycol di(meth) acrylates, polypropylend glycol di(meth)acrylates, neopentyl glycol di(meth)acrylates, trimethylolpropane tri(meth) acrylates, pentaerythritol di(meth)acrylates, pentaerythritol tri(meth)acrylates, pentaerythritol tetra(meth)acrylates, dipentaerythritol hexa(meth)acrylates, epoxy acrylates, polyester acrylates, urethane acrylates,

$CH_2=CH.C(O)O.(CH_2CH_2O)n.CH_3$ (n=1–10)    [Compound 11]

$CH_2=C(CH_3).C(O)O.(CH_2CH_2O)n.CH_3$ (n=1–30) [Compound 12]

$CH_2=CH.C(O)O.[CH_2CH(CH_3)O]n.CH_3$
(n=1–10) [Compound 13]

$CH_2=C(CH_3).C(O)O.[CH_2CH(CH_3)O]n.CH_3$
(n=1–10) [Compound 14]

$CH_2=C(CH_3).C(O)O.(CH_2CH_2O)n.[CH_2CH(CH_3)O]m.CH_3$
(n=1–10, m=1–10) [Compound 15]

$CH_2=CH.C(O)O.(CH_2CH_2O)n.[CH_2CH(CH_3)O]m.CH_3$ (n=1–10, m=1–10)[ Compound 16]

(meth)acrylonitrile, N-vinylpyrrolidone, N-acryloylmorpholine, N-vinylcaprolactone, N-vinylpiperidine, styrene, indene, a -methylstyrene, p-methylstyrene, p-chlorostyrene, p-chloromethyl styrene, p-methoxy styrene, p-tert-butoxystyrene, divinylbenzene, vinyl acetates, vinyl propionate, vinyl butyrates, vinyl caproates, vinyl benzoates, and vinyl cinnamates. These compounds may be used alone or in any combinations thereof.

Preferable for use as the copolymerizable monomer are methyl (meth)acrylates, ethyl (meth)acrylates, cyclohexyl (meth)acrylates, benzyl (meth)acrylates, glycidyl (meth) acrylates, tetrahydrofurfuryl (meth)acrylates, or (meth) acrylic esters having a C-O-C ether bond such as the compounds (11) through (16) as above-specified by structural formulas, since they have relatively higher levels of cohesion.

Also, more preferable for use as the high molecular weight polymer is a copolymer obtainable by copolymerizing a compound containing at least one (meth)acryloyl group and at least one hydroxyl group per molecule with the above copolymerizable monomer, which enables a shortened cure complete period from energy application till reaching a maximum adhesive strength and an enhanced adhesive strength.

Still more preferably, as the high molecular weight polymer, acrylic polymer is used which is obtainable by radically photopolymerizing a photopolymerizable composition containing acrylic monomers. In such a case, the photopolymerizable composition is irradiated with a light to yield the acrylic polymer via the radical photopolymerization. It follows that incorporation of the above monomer component and radical photopolymerization initiator in the photopolymerizable composition, together with the compound (A) containing an epoxy group and the polymerization initiator (C), enables readily obtaining the sheet-form, curable pressure-sensitive adhesive in accordance with the present invention by irradiating a sheet comprising the photopolymerizable composition with a light.

The Compound (B) Containing an Epoxy Group

The compound (B) containing an epoxy group for use in the sheet-form, curable pressure-sensitive adhesive of the present invention is utilized to undergo a ring-opening polymerization with the aid of the action of the polymerization initiator which, when an activation energy is applied thereto, induces the ring-opening polymerization of the epoxy linkages to take place, and thereby to cure the sheet-form, curable pressure-sensitive adhesive.

Any compounds which have an epoxy group may be used as the above compound containing an epoxy group. Examples of the compound containing an epoxy group include epoxy resins such as bisphenol A type epoxy resins, bisphenol F type epoxy resins, novolak type epoxy resins and alicyclic aliphatic epoxy resins; glycidyl ester type compounds; and glycidyl amine type compounds.

The Vinyl Ether Compound

Preferably, the sheet-form, curable pressure-sensitive adhesive in accordance with the present invention further contains the vinyl ether compound. The cationic polymerization of the vinyl ether compound predominantly progresses relative to the ring-opening polymerization of the compound (B) containing an epoxy group. Accordingly, such additional incorporation of the vinyl ether compound is effective in delaying the polymerization of the compound (B) containing an epoxy group, where irradiation of a light as an activation energy activates the polymerization initiator (C) to cause the ring-opening polymerization of the compound (B) to subsequently take place so that the sheet is cured. Furthermore, the adequate tackiness is given to the sheet-form, curable pressure-sensitive adhesive in an early stage after irradiation by the light, since an elastic modulus of the vinyl ether compound is substantially lower than that of the compound containing an epoxy group. These enable an enhanced degree of tackiness of the sheet-form, curable pressure-sensitive adhesive to an adherend and an extended period from energy application till application to the adherend, i.e., an extended pot life.

Examples of the vinyl ether compound include, but not limited to, n-propyl vinyl ethers, n-butyl vinyl ethers, isobutyl vinyl ethers, tert-butyl vinyl ethers, tert-amyl vinyl ethers, cyclohexyl vinyl ethers, 2-ethylhexyl vinyl ethers, dodecyl vinyl ethers, octadecyl vinyl ethers, 2-chloroethyl vinyl ethers, ethylene glycol butyl vinyl ethers, triethylene glycol methyl vinyl ethers, (4-ninyloxy)butyl benzoates, ethylene glycol divinyl ethers, diethylene glycol divinyl ethers, triethylene glycol divinyl ethers, tetraethylene glycol divinyl ethers, butane-1,4-diol-divinyl ethers, hexane-1,6-diol-divinyl ethers, cyclohexane-1,4-dimethanol-divinyl ethers, (4-vinyloxy)butyl isophthalates, di(4-vinyloxy)butyl glutarates, di(4-vinyloxy)butyl succinates, trimethylol propane trivinyl ethers, 2-hydroxyethyl vinyl ethers, 4-hydroxybutyl vinyl ethers, 6-hydroxyhexyl vinyl ethers, cyclohexane-1,4-dimethanol-monovinyl ethers, diethylene glycol monovinyl ethers, 3-aminopropyl vinyl ethers, 2-(N, N-diethylamino)ethyl vinyl ethers, urethane vinyl ethers, and polyester vinyl ethers. The above vinyl ether compounds may be used in any combinations thereof.

The Polymerization Initiator (C)

In the sheet-form, curable pressure-sensitive adhesive in accordance with the present invention, the polymerization initiator (C) is utilized which is activated upon application of the activation energy thereto, for the purpose of causing the compound (B) containing an epoxy group to undergo the ring-opening polymerization. Any types of initiators may be selected as the polymerization initiator, as long as they are capable of inducing the ring-opening polymerization of the compound (B) containing an epoxy group to take place. Such initiators include thermal polymerization initiators which are activated upon application of heat energy thereto, and photopolymerization initiators which are activated when irradiated with a light. In particular, cationic photopolymerization initiators are preferably used due to their applicability to adherends having a poor heat resistance.

As the thermal polymerimization initiators, any suitable polymerization initiators may be utilized which have the ability to be activated upon application of heat to cause the compound (B) containing an epoxy group to undergo the ring-opening polymerization. Illustrative of such initiators are dicyandiamides, hydrazides, imidazole compounds, amine adducts, amine imides, sulfonium salts, ammonium salts, pyridinium salts and the like.

Any initiators which are capable of causing the epoxy linkages to undergo the ring-opening polymerization when irradiated with a light may be useful for the photopolymerization initiators. For example, photo-sensitive onium salts or organometallic complexes can be suitably utilized.

The photo-sensitive onium salts are preferably used as the above cationic photopolymerization initiator. That is, the photo-sensitive onium salts are suitable for use as the compounds which can be activated when irradiated with an ultraviolet light in the preferable wavelength range above 300 nm which has a sufficiently high energy strength to effect a rapid progress of ring-opening of the epoxy linkages.

In an exemplary case where the photopolymerizable composition is irradiated with a light to yield tack polymers via the radical photopolymerization, the radiation preferably has a wavelength of at least 370 nm. In such a case, the radiation must be in the wavelegth range below 370 nm when applied to cure the sheet-form, curable pressure-sensitive adhesive. Suitably, the above photo-sensitive onium salts can be activated by the radiation in the wavelength range below 370 nm.

Also, the above-described onium salt compounds are thermally stable to advantageously enhance storage stability of the sheet-form, curable pressure-sensitive adhesive until exposure to radiation. Furthermore, since their terminal structures for propagation are active enough to react at ambient temperature and their deactivation to stop the reaction is not expected to occur, the curing reaction both after exposure to radiation and after application to an adherend can be insured to progress.

Specifically applicable onium salt compounds include aromatic diazonium salts, aromatic iodonium salts, aromatic sulfonium salts, and pyridinium salts. The commercially available onium salt compounds which are applicable to the present invention include OPTOMER-SP-150 (manufactured by Asahi Denka kogyo Ltd.), OPTOMER-SP-151 (manufactured by Asahi Denka kogyo Ltd.), OPTOMER-SP-170 (manufactured by Asahi Denka kogyo Ltd.), OPTOMER-SP-171 (manufactured by Asahi Denka kogyo Ltd.), UVE-1014 (manufactured by General Electronics Corp.), CD-1012 (manufactured by Sartomer Corp.), SUNAID SI-60L (Sanshin Chem. Ind. Ltd.), SUNAID SL-80L (Sanshin Chem. Ind. Ltd.), SUNAID SI-100L (Sanshin Chem. Ind. Ltd.), CI-2064 (manufactured by Nippon Soda Co. Ltd.), CI-2639 (manufactured by Nippon Soda Co. Ltd.), CI-2624 (manufactured by Nippon Soda Co. Ltd.), CI-2481 (manufactured by Nippon Soda Co. Ltd.).

Lamps useful for the aforementioned irradiation can be any lamps which have a radiation distribution not exceeding 800 nm. The lamps having the radiation distribution not exceeding 370 nm may be preferably employed when the radical photopolymerization is utilized to obtain acrylic polymers. Examples of applicable lamps include a low-pressure mercury vapor lamp, a moderate-pressure mercury vapor lamp, a high-pressure mercury vapor lamp, an ultra high-pressure mercury vapor lamp, chemical lamps, black-light lamps, microwave-exciting mercury vapor lamps, and metal halide lamps. When it is necessary to avoid curing dominantly in a surface layer to insure internal curing, the irradiation may be applied with a wavelength region not exceeding 300 nm being excluded.

Mixing Proportions

In the present invention, the mixing proportions of the high molecular weight polymer (A), the compound (B) containing an epoxy group and the polymerization initiator (C) are not particularly limited, as long as the adequate tackiness of the sheet-form, curable pressure-sensitive adhesive and the adequate adhesive strength thereof after the activation energy application are insured to be obtained. However, it is preferred to add 1–10000 parts by weight of the compound containing an epoxy group and 0.01–1000 parts by weight of the polymerization initiator (C) per 100 parts by weight of the high molecular weight polymer.

If the mixing proportion of the compound containing an epoxy group is below 1 part by weight, in some cases, inadequate adhesive strength may result when the activation energy is applied to cure the compound containing an epoxy group. As it goes beyond 10000 parts by weight, the relative proportion of the high molecular weight polymer (A) becomes smaller so that inadequate tackiness may result. On the other hand, if the mixing proportion of the polymerization initiator (C) falls below 0.01 parts by weight, it becomes difficult in some instances to fully polymerize the compound (B) containing an epoxy group even upon application of the activation energy. As it exceeds 1000 parts by weight, the relative proportion of the polymerization initiator becomes excessively larger to possibly cause the epoxy consumption to proceed rapidly upon exposure to a light so that curing is almost completed before combining adherends to provide poor adhesion. This results in reduced tackiness and adhesive strength after curing.

When the aforementioned vinyl ether compound is additionally incorporated in accordance with the present invention, it is preferred to add 30–70 parts by weight of the compound (B), 1–30 parts by weight of the vinyl ether compound, and 0.01–10 parts by weight of the cationic photopolymerization initiator.

If the mixing proportion of the compound containing an epoxy group is below 30 parts by weight, the inherent adhesive strength of the epoxy resin may not be fully imparted even if curing should occur. If it exceeds 70 parts by weight, a reduced cohesive strength of the sheet-form, curable pressure-sensitive adhesive possibly results so that its pressure-sensitive adhesion to an adherend may become difficult. Accordingly, an improved workability may not be expected.

On the other hand, if the mixing proportion of the vinyl ether compound is below 1 part by weight, curing may become substantially comparable to that of the vinyl ether compound sole. If it goes beyond 30 parts by weight, a reduced strength of a photocured substance possibly results so that adequate adhesive strength may not be obtained.

If the mixing proportion of the cationic photoinitiator falls below 0.01 parts by weight, a resulting concentration of the cationically polymerizable species possibly becomes too low to increase a curing speed to a suitable level. If it is greater than 30 parts by weight, curing progresses rapidly at a surface of the sheet-form, curable pressure-sensitive adhesive to possibly prevent an adhesive surface of the same from intimately contacting with an adherend, even if the vinyl ether compound is included as one component. This may result in its inadequate adhesive strength, although an ultimate mechanical strength may be adequately given to the cured substance. In the above-described preferred formulation, the mixing proportion of the cationic photoinitiator is more preferably from 0.05 to 5 parts by weight, still more preferably in the range of 0.1 to 3 parts by weight.

As to incorporation of the acrylic polymer, 30–70 parts by weight of the acrylic polymer is preferably added to 30–70 parts by weight of the compound containing an epoxy group, 1–30 parts by weight of the vinyl ether compound and 0.01–10 parts by weight of the cationic photoinitiator. If the mixing proportion of the acrylic polymer is below 30 parts by weight, a reduced cohesive strength of the sheet-form, curable pressure-sensitive adhesive may result to possibly prevent the pressure-sensitive adhesion thereof to the adherend so that an improved workability may not be attained. If it is greater than 70 parts by weight, the inherent adhesion of the epoxy resin may not be expected in some instances.

Other Additives

When necessary to improve cohesive strength at an elevated temperature and/or heat resistance, the sheet-form, curable pressure-sensitive adhesive in accordance with the present invention may further contain, if desired, one or more of such curable monomers as polyfunctional acrylate monomers and polyfunctional vinyl monomers in suitable proportions which will not otherwise adversely affect the purpose of the invention.

Examples of the curable monomers include, but not limited to, hexane diol di(meth)acrylates, ethylene glycol di(meth)acrylates, polyethylene glycol di(meth)acrylates, propylene glycol di(meth)acrylates, polypropylene glycol di(meth)acrylates, neopentyl glycol di(meth)acrylates, trimethylolpropane tri(meth)acrylates, pentaerythritol di(meth) acrylates, pentaerythritol tri(meth)acrylates, pentaerythritol tetra(meth)acrylates, dipentaerythritol hexa(meth)acrylates, epoxy acrylates, polyester acrylates, urethane acrylates and any suitable combinations thereof.

In addition to the tack polymer, the compound containing an epoxy group and the cationic photoinitiator, the sheet-form, curable pressure-sensitive adhesive in accordance with the present invention may further contain known tackifying resins and/or extenders in suitable proportions which will not otherwise adversely affect the purposes of the invention.

For example, such tackifying resins as rosin resins, modified rosin resins, terpene resins, terpene phenol resins, aromatic modified terpene resins, C5 or C9 type petroleum resins, and chroman resins may be added for the purpose of improving tackiness of the sheet-form, curable pressure-sensitive adhesive.

In a particular case where an adherend is of polyolefins, the use of rosin or petroleum resins is preferred for its ability to provide strong adhesion.

Also, thickeners such as acrylic rubbers, epichlorhydrin rubbers, isoprene rubbers, and butyl rubbers; thixotropic agents such as colloidal silica and poly(vinyl pyrrolidone); extenders including calcium carbonates, titanium oxides, clays and the like; and the others may further be added in an attempt to improve coatabililty of the composition.

For the purpose of providing the sheet-form, curable pressure-sensitive adhesive with high shear bond strength, further added may be inorganic balloons such as glass balloons, alumina balloons, and ceramic balloons; organic spheres such as nylon beads, acrylic beads, and silicone beads; organic balloons such as vinylidene chloride balloons and acrylic balloons; monofibers such as of glass, polyester, rayon, nylon, cellulose and the others; and the others.

While possible to add glass fibers in fibrous chip form to the composition, it is preferred to impregnate glass woven fibers with the aforementioned photopolymerizable composition to impart increased shear bond strength.

Preparation of the Sheet-Form, Curable Pressure-Sensitive Adhesives

The sheet-form, curable pressure-sensitive adhesive in accordance with the present invention may be prepared by any suitable means known in the art, such as solvent coating, extrusion coating, calendering, UV polymerization.

In accordance with the solvent coating process, an organic solvent dissolves the tack polymer, the compound containing an epoxy group, the polymerization initiator and, if necessary, the vinyl ether compound before it is coated on a base material and subsequently dried to form a sheet. The extrusion coating or calendering is a process wherein a composition is heat melted which includes a hot-melt tack polymer having a weight average molecular weight of from about several tens thousands to about 0.5 million, the compound containing an epoxy group, the cationic photoinitiator, and, if necessary, the vinyl ether compound. The melted composition is coated on a base material by means of a melt coating equipment.

For an exemplary purpose, one preferred embodiment of the process for preparing the sheet-form, curable pressure-sensitive adhesive in accordance with the present invention is hereinafter described utilizing the above-mentioned UV polymerization process. In this preferred embodiment, a photopolymerizable composition is employed which includes a radical photoinitiator capable of being activated by irradiation in a different wavelength region from those respective regions for (meth)acrylate monomers and photo-sensitive onium salt compound, the compound containing an epoxy group, the vinyl ether compound if necessary, and the photo-sensitive onium salt compound. The sheet-form, curable pressure-sensitive adhesive can be obtained by coating photopolymerizable composition on a suitable substrate sheet, and photoactivating only the radical photoinitiator to cause a radical polymerization to dominantly take place so that an acrylic polymer as the tack polymer is formed on the substrate sheet.

In such a process utilizing the photopolymerizable composition, the acrylic polymer as the tack polymer can be obtained by irradiation with a light.

In the above preferred embodiment, suitable photo-sensitive onium salt compound and radical photoinitiator may be selected in a more preferable manner so that the photo-sensitive onium salt compound is little photoactivated by a radiation in a wavelength region equal to and greater than 370 nm while the radical photoinitiator is photoactivated by a radiation in a wavelength region equal to and greater than 370 nm but below 800 nm. Accordingly, the sheet-form, curable pressure-sensitive adhesive can be obtained by irradiation in a wavelength region from 370 nm to 800 nm.

If the irradiation used in the preparation has a wavelength equal to or greater than 800 nm, radiation heat acts to degrade the sheet-form, curable pressure-sensitive adhesive, which accordingly necessiates additional provisions such as of a heat radiation cut filter or other heat removing facilities. On the contrary, such a need is eliminated if the photoinitiator is used which can be photoactivated by irradiation in a wavelength region below 800 nm as described above.

The irradiation in a wavelength of less than 370 nm activates the photo-sensitive onium salt compound so that the sheet-form, curable pressure-sensitive adhesive of the present invention can not be obtained. In view of such a disadvantage, the radical photoinitiator is preferably used which is capable of being photoactivated by irradiation in a wavelength region equal to and greater than 370 nm but below 800 nm as described above.

As can be appreciated from the above description, the 370 nm wavelength is regarded as bounding the spectrum into two different wavelength regions; the wavelength region suitable for photoactivating the photo-sensitive onium salt compound and the wavelength region suitable for photoactivating the radical photoinitiator. Accordingly, the selective use of different light sources having their respective output spectral patterns enables readily providing different radiations having their respective wavelength regions, i.e., one radiation having the wavelength region equal to or greater than 370 nm and another radiation having the wavelength region below 370 nm.

Since it needs a higher energy to induce ring-opening of the epoxy linkages than required for inducing the radical photopolymerization, it is desirable that the radical photopolymerization is effected by irradiation in the wavelength region equal to or greater than 370 nm while the irradiation in the wavelength region below 370 nm is used to initiate the cationic photopolymerization to allow the ring-opening reaction of the epoxy linkages to take place.

The radical photoinitiator as described above as being photoactivated by irradiation in a wavelength region equal to or greater than 370 nm is the compound which must be photoactivated by irradiation of a light in a wavelength region equal or and greater than 370 nm, and which preferably does not permit an energy to be transferred to the cationic photoinitiator when received a radiation in a wavelength region below 370 nm. Suitable examples of such a radical photoinitiator include acetophenone derivative compounds such as 4-(2-hydroxyethoxy)phenyl(2-hydroxy-2-propyl)ketone, α-hydroxy-α,α'-dimethylacetophenone, methoxyacetophenone, 2,2-dimethoxy-2-phenylacetophenone; benzoin ether compounds such as benzoin ethyl ether, benzoin isopropyl ether; ketal derivative compounds such as benzyldimethyl ketal; ketone halides; acylphosphine oxides; acylphosphonates; and bis-(2,6-dimethoxybenzoyl)- 2,4,4-trimethylpentyl phosphine oxides.

Of the above photoinitiators, particularly preferred are acylphosphine oxides, acylphophonates, and bis-(2,6-dimethoxybenzoyl)-2,4,4-trimethylpentyl phosphine oxides which show high levels of adsorption index to a light in a wavelength region exceeding 370 nm.

Examples of lamps useful for irradiation in the practice of the radical photopolymerization include a low-pressure mercury vapor lamp, a moderate-pressure mercury vapor lamp, a high-pressure mercury vapor lamp, an ultra high-pressure mercury vapor lamp, chemical lamps, blacklight lamps, microwave-exciting mercury vapor lamps, metal halide lamps and fluorescent lamp.

The Curable Pressure-Sensitive Adhesive Members

The sheet-form, curable pressure-sensitive adhesive in accordance with the present invention may be employed as a double-sided pressure-sensitive adhesive tape which, when in use, is interposed between two adherends for joining thereof. Alternatively, the sheet-form, curable pressure-sensitive adhesive may be placed on at least one surface of a substrate to form a curable pressure-sensitive adhesive sheet.

Suitable substrates for such a sheet include, but not limited to, non-woven fabrics such as of rayons and celluloses; plastic films or sheets made of synthetic resins such as polyethylene, polyester, cellophane, polypropylene, polystyrene, and polyimido; foams such as polyethylene foams, urethane foams, neoprene foams, vinyl chloride foams, and polystyrene foams; plastic plates made of synthetic resins such as polystyrene, ABS, acrylics, polypropylene, and polyethylene; metallic sheets or plates such as of steel, stainless steel, copper, aluminium; glasses; woods; papers; clothes; tiles; plaster boards; and calcium silicate insulator.

Any shaped substrates may be employed, without limited to those having small thickness dimensions such as in a sheet or plate form, examples of which include square columns, rods, spheres, those having nonspherical surfaces.

Procedures for Joining Adherends

Where two adherends are joined together by means of the sheet-form curable pressure-sensitive adhesive of the present invention, an activation energy is applied to cure the sheet-form curable pressure-sensitive adhesive either before or after the adherends are combined via the same. The expression "before the adherends are combined" as used herein is intended to mean literally before the adherends are combined and in effect before the curing of resins containing an epoxy group through application of the activation energy is completed. When the curing of the compound containing an epoxy group through the activation energy application is completed, the sheet-form curable pressure-sensitive adhesive possibly becomes too stiff to provide adequate initial tackiness.

If the sheet-form curable pressure-sensitive adhesive is, prior to joining the adherends, irradiated with a light as the activation energy to allow the curing thereof to progress, at least one adherend does not receive the irradiation so that photodegradation or photo-deterioration thereof can be avoided. Thus, it is desirable to irradiate the sheet-form curable pressure-sensitive adhesive prior to joining the adherends which are likely to be degraded or deteriorated by irradiation. In a particular case where one adherend is easy to degrade or deteriorate upon exposure to irradiation while another adherend is difficult, the sheet-form curable pressure-sensitive adhesive may be first combined with the another adherend, followed by the irradiation, and is subsequently combined with the one adherend.

As to a wavelength of irradiation for photocuring, when the photo-sensitive onium salt compound is used as the cationic photoinitiator, it is preferable to utilize the irradiation in a wavelength region equal to and greater than 300 nm and having an intensity from 1 mW/cm$^2$ to 100 mW/cm$^2$, preferably from 5 mW/cm$^2$ to 100 mW/cm$^2$. The radiation having a wavelength below 300 nm is able to provide a sufficient activation energy for activating the photo-sensitive onium salt compound, however, its transmittance is insufficient such that only the tacky surface of the sheet-form curable pressure-sensitive adhesive may be crosslinked. This possibly prohibits an intimate contact of the sheet-form curable pressure-sensitive adhesive surface with the adhrends. In some instances, an interior of the sheet-form curable pressure-sensitive adhesive remains uncured.

If the radiation in a wavelength region equal to and greater than 300 nm has an intensity of below 1 mW/cm$^2$, its energy is insufficient to activate the photo-sensitive onium salt compound so that only a small proportion thereof is photoactivated. This results in a reduced curing speed. From the foregoings, a useful radiation preferably has a wavelength of at least 300 nm, more preferably at least 300 nm but below 800 nm, still more preferably at least 300 nm but below 400 nm.

On the other hand, if the irradiation intensity goes beyond 10 mW/cm$^2$, radiation heat reaches a substantial level to promote the cure reaction. Accordingly, the adherends must be combined together immediately after the irradiation, i.e., prior to a rapid surface curing of the sheet-form, curable

DESCRIPTION OF THE PREFERRED EXAMPLES

Example 1

A separable flask was charged with 70 g of 2-ethylhexyl acrylate, 30 g of N-vinyl pyrrolidone, 2 g of CYCLOMER (manufacture by Daicel Chemical Industries Ltd.) as an epoxy-containing (meth)acrylate monomer, 50 g of EPI-COAT 828 (manufactured by Yuka-Shell Epoxy Co.), 0.05 g of bis(2,6-dimethoxybenzoyl)-2,4,4-trimethylpentylphosphine oxide as a radical photopolymerization initiator, 0.5 g of OPTOMER SP-170 (manufactured by Asahi Denka Kogyo Ltd.) as a cationic photopolymerization initiator. The mixture was stirred in the flask to insure complete homogeneity thereof, and was thereafter purged with nitrogen gas to remove dissolved oxygen, thereby obtaining a photopolymerizable composition.

The photopolymerizable composition obtained was coated on a release surface of a transparent PET [poly (ethylene terephthalate)] film to a thickness of 300 $\mu$m. Another transparent PET film also having a release surface was laminated onto the coated composition so as to face its release surface toward the composition. As a result, the coated photopolymerizable composition was flanked by the pair of transparent PET films to form a laminate. The laminate was irradiated from above with a fluorescent lamp emitting a radiation having a maximum wavelength of 400 nm so that the composition was exposed via one of the transparent PET films to a near ultraviolet light which substantially excluded a radiation in the wavelength range below 370 nm. The near ultraviolet irradiation was continued at an intensity of 6 mW/cm$^2$ for 5 minutes to form a sheet-form, cur able pressure-sensitive adhesive sheet flanked between the pair of transparent PET films. During the irradiation, an intensity of the irradiation in the wavelength range below 370 nm was found to be 0.001 mW/cm$^2$.

A T-peel strength and an overlap shear stress of the sheet-form, curable pressure-sensitive adhesive obtained were respectively measured at room temperature in accordance with JIS Z 0237 to reveal 0.4 kgf/cm and 2.5 kgf/cm$^2$ with use of stainless steel as adherend, respectively.

The sheet-form, curable pressure-sensitive adhesive flanked between the pair of transparent PET films was exposed for 60 seconds to an ultraviolet light having an intensity of 25 mW/cm$^2$ in the wavelength range below 370 nm, using an ultra high-pressure mercury vapor lamp capable of emitting a radiation with a maximum wavelength at 365 nm. At least one of the pair of transparent PET films was removed from the laminate to subsequently adhere an exposed surface of the coated composition to an adherend. The T-peel strength and overlap shear stress immediately after the adhesion were measured at room temperature to be 0.5 kgf/cm and 2.6 kgf/cm$^2$ with use of stainless steel as adherend, respectively. Those values after they had been left overnight were 3 kgf/cm and 15 kgf/cm$^2$, respectively.

Also, the sheet-form, curable pressure-sensitive adhesive flanked between the pair of transparent PET films was cut into a 20 mm by 20 mm strip. One of the transparent PET film was removed from the strip which was then on its adhesive surface backed by a stainless steel foil. The sheet-form, curable pressure-sensitive adhesive was exposed through the remaining transparent PET film to a near ultraviolet light in the same manner as described above. The remaining transparent PET film was then peeled for removal from the sheet-form, pressure-sensitive adhesive which was subsesquetnly on its exposed surface adhered to a stainless steel plate so that the sheet-form, curable pressure-sensitive adhesive was flanked between the stainless steel foil and plate. A weight was suspended from the stainless steel plate to apply a load of 1 kgf in a shear direction at 100° C. The weight did not fall even in 24 hours after application of the load.

Example 2

A sheet-form, curable pressure-sensitive adhesive was obtained in the same manner as described in Example 1, except that 5 g of glass fiber chips was added to the photopolymerizable composition of Example 1.

A T-peel strength and an overlap shear stress of the sheet-form, curable pressure-sensitive adhesive obtained were respectively measured at room temperature in accordance with JIS Z 0237 to reveal 0.3 kgf/cm and 6 kgf/cm$^2$ with use of stainless steel as adherend, respectively.

The sheet-form, curable pressure-sensitive adhesive was irradiated with an ultraviolet light in the same manner as practiced in Example 1 and then adhered to an adherend. The T-peel strength immediately after adhesion were 3 kgf/cm and the overlap shear stress exceeded 18 kgf/cm$^2$.

Example 3

A sheet-form, curable pressure-sensitive adhesive flanked between the pair of transparent PET films was obtained in the same manner as practiced in Example 1, except that epoxy-containing (meth)acrylate monomers were not used.

A T-peel strength and an overlap shear stress of the sheet-form, curable pressure-sensitive adhesive obtained were respectively measured at room temperature in accordance with JIS Z 0237 to reveal 0.45 kgf/cm and 4.5 kgf/cm$^2$ with use of stainless steel as adherend, respectively.

One of the transparent PET film was peeled for removal from the sheet-form, curable pressure-sensitive adhesive which was subsequently on its exposed surface adhered to an adherend. The sheet-form, curable pressure-sensitive adhesive was exposed via the remaining transparent PET film to a radiation having an intensity of 25 mW/cm$^2$ for 30 seconds, using an ultra high-pressure mercury vapor lamp which had a emitting radiation with a maximum wavelength at 365 nm. The remaining transparent PET film was removed from the sheet-form adhesive which was subsequently on its exposed surface adhered to another adherend.

The T-peel strength and overlap shear stress immediately after the adhesion were 0.6 kgf/cm and 4.5 kgf/cm$^2$, respectively. Those values after they had been left overnight were 3.5 kgf/cm and 15 kgf/cm$^2$, respectively.

Also, the sheet-form, curable pressure-sensitive adhesive flanked between the pair of transparent PET films was cut into a 20 mm by 20 mm strip. One of the transparent PET film was peeled for removal from the sheet-form, curable pressure-sensitive adhesive which was then on its exposed surface backed by a stainless steel foil. The sheet-form, curable adhesive was exposed through the remaining transparent PET film to an ultraviolet light in the same manner as practiced in Example 1. The remaining transparent PET film was peeled for removal from the irradiated sheet-form adhesive which was then on its exposed surface adhered to a stainless steel plate so that the sheet-form adhesive was flanked between the stainless steel foil and plate. A weight was suspended from the stainless steel plate to apply a load of 1 kgf in a shear direction at 100° C. The weight fell in 5 minutes after application of the load.

Example 4

Into a 0.5 L separable flask was charged 30 g of glycidyl methacrylate, 90 g of epoxy resin (manufactured by Yuka-Shell Epoxy Corp.; product name: EPICOAT 828), 10 g of cyclohexanedimethanol divinyl ether (manufactured by ISP Corp.), 0.1 g of bis(2,6-dimethoxybenzoyl)-2,4,4-trimethylpentylphosphine oxide (manufactured by Chiba Geigy; product name: IRGACURE 1700) as a radical photoinitiator, 0.5 g of a cationic photoinitiator (manufacture by Asahi Denka Kogyo Ltd.; product name: OPTOMER SP-170). The mixture was stirred in the flask to insure complete homogeneity thereof, followed by bubbling a nitrogen gas therethrough to remove dissolved oxygen, to obtain a photopolymerizable composition.

The photopolymerizable composition obtained was coated on a release surface of a transparent PET (polyethylene terephthalate) film to a thickness of 300 μm. Another transparent PET film having a release surface was laminated onto the coated composition so as to face its release surface toward the composition. As a result, a coated photopolymerizable composition was flanked by the pair of transparent PET films to form a laminate. The laminate was irradiated with a fluorescent lamp emitting a radiation having a maximum wavelength of 400 nm so that the composition was exposed via at least one of the transparent PET films to a near ultraviolet light which substantially excluded a radiation in the wavelength range below 370 nm. The near ultraviolet irradiation was continued at an intensity of 1 mW/cm$^2$ for 10 minutes to obtain a sheet-form, curable pressure-sensitive adhesive present between the pair of transparent PET films.

Examples 5–9 and Comparative Examples 1 and 2

In Examples 5–9 and Comparative Examples 1 and 2, respective sheet-form, curable pressure-sensitive adhesives flanked between the pair of transparent PET films were obtained in the same manner as practiced in Example 4, except that the photopolymerizable compositions as employed in respective Examples included different types and/or amounts of components, with the exception of the radical photoinitiator consistently employed throughout Examples, as listed in the following Table 1.

Evaluations of Examples 4–9 and Comparative Examples 1 and 2

I. Evaluation of Overlap Shear Strength Immediately After Irradiation

One of the transparent PET film was removed from the laminate which was then cut into a 25 mm×25 mm laminate strip. The strip was on its adhesive surface adhered onto a stainless steel plate (SUS 304, hereinafter referred to as an adherend A) which was 25 mm in width, 150 mm in length, and 2 mm in thickness. Subsequently, the laminate was irradiated with a light having an intensity of 30 mW/cm$^2$ in a wavelength region from 300 nm to 370 nm such that the coated composition was exposed through the remaining transparent PET film to the light for 60 seconds. As shown in Table 1, either immediately after irradiation, the remaining transparent PET film was removed from the laminate to adhere an exposed surface of the sheet-form, curable pressure-sensitive adhesive to an adherend B which was of the same material and dimension as those of the adherend B. As a result, a test piece for overlap shear strength measurement was prepared which included the sheet-form, curable pressure-sensitive adhesive joining the adherends A and B. After the joint of the adherends A and B, the above test piece was aged for 7 days before its overlap shear strength was measured at room temperature in accordance with JIS K 6850. The results are given in Table 1.

II. Evaluations of Pot Life

The test piece was aged for 7 days before its overlap shear strength was measured in the same manner as the above evaluation of overlap shear strength, except that the adhesion to the adherend B was delayed a predetermined time period after irradiation. The time period can be considered to be within a pot life, provided that its corresponding overlap shear strength value as herein measured is comparable to that measured in the above evaluations wherein the adhesion to the adherend B was effected immediately after irradiation. Accordingly, a maximum time period from irradiation till adhesion to the adherend B was determined as a pot life when an overlap shear strength value corresponding to the time period approximately reached a corresponding overlap shear strength value obtained in the above evaluations of overlap shear strength immediately after irradiation. The results are also shown in Table 1.

TABLE 1

| | | Example 4 | Example 5 | Example 6 | Example 7 | Example 8 | Example 9 | Comparative Example | Comparative Example |
|---|---|---|---|---|---|---|---|---|---|
| Compound Containing an Epoxy Group [Parts by Weight] | Epoxy Resin 1 | 90 | 80 | 65 | 60 | 65 | 60 | 100 | 70 |
| | Epoxy Resin 2 | | | 30 | 30 | 30 | 30 | | 30 |
| Vinyl Ether Compound [Parts by Weight] | Cyclohexane Dimethanol Divinyl Ether | 10 | 20 | 5 | 10 | | | | |

TABLE 1-continued

|  |  | Example 4 | Example 5 | Example 6 | Example 7 | Example 8 | Example 9 | Comparative Example | Comparative Example |
|---|---|---|---|---|---|---|---|---|---|
|  | Triethylene Glycol Methyl Vinyl Ether |  |  |  |  | 5 | 10 |  |  |
| Photosensitive Onium Salt [Parts by Weight] | SP-170 | 0.5 | 0.5 | 0.5 | 0.5 | 0.5 | 0.5 | 0.5 | 0.5 |
| Acrylic Monomer [Parts by Weight] | Glycidyl Methacrylate | 30 | 30 | 30 | 30 | 30 | 30 | 30 | 30 |
| Overlap Shear Strength Immediately After Irradiation (kgf/cm$^2$) |  | 15.7 | 15.9 | 24.3 | 17.4 | 21 | 12 | 11.6 | 30.4 |
| Pot Life [Minutes] |  | 30 | 60 | 120 | 60 | 120 | 120 | 10 | 30 |

In Table 1; "Epoxy resin 1" and "Epoxy resin 2" indicate EPICOAT 828 (product name) manufactured by Yuka-Shell Epoxy Corp. and RIKARESIN BEO-60E (product name) manufactured by New Japan Chemical Co., Ltd., respectively. Also, "cyclohexanedimethanol divinyl ether" and "trietylene glycol metylvinyl ether" are products manufactured by ISP TECHNOLOGIES, INC. and BASF, respectively.

Example 10

Into a 2 L separable flask is charged 50 g the above-mentioned compound 2 (manufactured by Daicel Chem. Ind. Ltd.; product name: PLACCEL FM-2D; n=2), 150 g of glycidyl methacrylate, 300 g of epoxy resin (manufactured by Yuka-Shell Epoxy Corp.; product name: EPICOAT 828), 150 g of epoxy resin (manufactured by New Japan Chemical Co., Ltd.; product name: RIKARESIN BEO-60E), 0.5 g of bis(2,6-dimethoxybenzoyl)-2,4,4-trimethylpentylphosphine oxide (manufactured by Chiba Geigy; product name: IRGACURE 1700) as a radical photoinitiator, and 2.5 g of a cationic photoinitiator (manufacture by Asahi Denka Kogyo Ltd.; product name: OPTOMER SP-170). The mixture was stirred in the flask to insure complete homogeneity thereof, followed by bubbling a nitrogen gas therethrough to remove dissolved oxygen, to obtain a photopolymerizable composition.

The photopolymerizable composition obtained was coated on a release surface of a transparent PET [poly (ethylene terephthalate)] film to a thickness of 0.3 mm. Another transparent PET film also having a release surface was laminated onto the coated composition so as to face its release surface toward the composition. Thus, the coated photopolymerizable composition was flanked by the pair of transparent PET films to form a laminate.

The laminate was irradiated with a fluorescent lamp emitting a radiation having a maximum wavelength of 400 nm so that the coated composition was exposed via at least one of the transparent PET films to a near ultraviolet light which substantially excluded a radiation in the wavelength range below 370 nm. The near ultraviolet irradiation was continued at an intensity of 1 mW/cm$^2$ for 10 minutes to obtain a sheet-form, curable pressure-sensitive adhesive present between the pair of transparent PET films.

Examples 11–28 and Comparative Examples 3–10

In Examples 11–28 and Comparative Examples 3–10, respective sheet-form, curable pressure-sensitive adhesives flanked between the pair of transparent PET films were obtained in the same manner as practiced in Example 10, with the exceptions that the photopolymerizable compositions as employed in respective Examples were altered as listed in the following Tables 2–5.

In addition, the details of product name shown in Tables 2–5 are as follows;

(1) PLACCEL FM-2D . . . manufactured by Daicel Chem. Ind. Ltd., and corresponds to the above mentioned compound 2, n=2.

(2) PLACCEL FM-1D . . . manufactured by Daicel Chem. Ind. Ltd., and corresponds to the above mentioned compound 2, n=1.

(3) PLACCEL FM-5D . . . manufactured by Daicel Chem. Ind. Ltd., and corresponds to the above mentioned compound 2, n=5.

(4) BLENMER PP-500 . . . manufactured by Nippon Oil & Fats Co., Ltd. and corresponds to the above mentioned compound 6, n=9.

(5) ADEKARESIN EP-4901 . . . manufactured by Asahi Denka Kogyo Ltd., epoxy resin.

(6) ADEKARESIN EP-4080 . . . manufactured by Asahi Denka Kogyo Ltd., epoxy resin.

(7) SELOKISAIDO 2081 . . . manufactured by Daicel Chem. Ind. Ltd., epoxy resin.

Evaluation of Examples 11–28 and Comparative Examples 3–10 Evaluation of Overlap Shear Strength One of the transparent PET film was removed from the laminate which was then cut into a 25 mm×25 mm laminate strip. The strip was on its adhesive surface adhered onto a stainless steel plate (SUS 304, hereinafter referred to as an adherend A) which was 25 mm in width, 150 mm in length, and 2 mm in thickness. The stainless steel plate was abrased by a water-resistant abrasive paper #280, degreased at its surface with ethyl acetate, and dried. Subsequently, the laminate was irradiated with a light having an intensity of 30 mW/cm² in a wavelength region from 300 nm to 370 nm such that the sheet-form, curable pressure-sensitive adhesive was exposed through the remaining transparent PET film to the light for 30 seconds.

Immediately after the irradiation, the remaining transparent PET film covering a back surface of the sheet-form composition was removed from the laminate to adhere an exposed surface of the sheet-form composition to an adherend B which was prepared in the same manner as the adherend A. As a result, a test piece for overlap shear strength measurement was prepared which included the sheet-form, pressure-sensitive adhesive composition joining the adherends A and B.

After the joint of the adherends A and B, the above test piece was aged for 7 days before its overlap shear strength was measured at a stress speed of 10 mm/min in accordance with JIS K 6850 and Z 0237. The results are given in the following Tables 2–5.

Evaluation of Complete Finish Time of Curing

A test piece for shear bond strength measurement was obtained in the same manner as described in the above evaluations of shear bond strength. The test piece was measured for its shear bond strength at a stress speed of 10 mm/min according to JIS K 6850 and Z 0237 at predetermined time intervals after irradiation. Assuming that the overlap shear strength value approximately reached an ultimate value when the measured overlap shear strength became to be approximately equal to the value after aging of 7 days in the above evaluation of overlap shear strength, the time period was determined as a complete finish time of curing.

TABLE 2

|  |  | Example | | | | Comparative Example |
|---|---|---|---|---|---|---|
|  |  | 10 | 11 | 12 | 13 | 3 |
| Acrylic Monomer | Compound 2, n = 2, PLACCEL FM-2D | 10 | 20 | 40 | 60 |  |
| Copolymerizable Monomer | Glycidyl Methacrylate | 30 | 30 | 30 | 30 | 30 |
| Compound Containing an Epoxy Group | EPICOAT 828 | 60 | 50 | 30 | 10 | 70 |
|  | RIKARESIN BEO-60E | 30 | 30 | 30 | 30 | 30 |
| Radical Photoinitiator | IRGACURE 1700 | 0.1 | 0.1 | 0.1 | 0.1 | 0.1 |
| Cationic Photoinitiator | OPTOMER SP-170 | 0.5 | 0.5 | 0.5 | 0.5 | 0.5 |
| SUS Overlap Shear Strength (kgf/cm²) |  | 41 | 53 | 65 | 53 | 25 |
| Complete Finish Time of Curing (Hours) |  | 72 | 72 | 120 | 120 | 170 |

[All Mixing Proportions are indicated by Parts by Weight]

TABLE 3

|  |  | Example | | Comparative Example |
|---|---|---|---|---|
|  |  | 14 | 15 | 4 |
| Acrylic Monomer | Compound 2, n = 2, PLACCEL FM-2D | 10 | 20 |  |
| Copolymerizable Monomer | Glycidyl Methacrylate | 30 | 30 | 30 |
| Compound Containing an Epoxy Group | EPICOAT 828 | 40 | 30 | 50 |
|  | RIKARESIN BEO-60E | 20 | 20 | 20 |
| Radical Photoinitiator | IRGACURE 1700 | 0.1 | 0.1 | 0.1 |
| Cationic Photoinitiator | OPTOMER SP-170 | 0.5 | 0.5 | 0.5 |
| SUS Overlap Shear Strength (kgf/cm²) |  | 60 | 62 | 44 |
| Complete Finish Time of curing (Hours) |  | 140 | 120 | 170 |

[All Mixing Proportions are indicated by Parts by Weight]

TABLE 4-1

|  |  | Example | | Comparative Example |
|---|---|---|---|---|
|  |  | 16 | 17 | 5 |
| Acrylic Monomer | Compound 2, n = 2, PLACCEL FM-2D | 10 | 20 |  |
| Copolymerizable Monomer | Tetrahydrofurfuryl Acrylate | 30 | 30 | 30 |
| Compound Containing an Epoxy Group | EPICOAT 828 | 40 | 20 | 50 |
|  | RIKARESIN BEO-60E | 20 | 20 | 20 |
| Radical Photoinitiator | IRGACURE 1700 | 0.1 | 0.1 | 0.1 |
| Cationic Photoinitiator | OPTOMER SP-170 | 0.5 | 0.5 | 0.5 |
| SUS Overlap Shear Strength (kgf/cm²) |  | 80 | 90 | 59 |
| Complete Finish Time of Curing (Hours) |  | 24 | 24 | 48 |

[All Mixing Proportions are indicated by Parts by Weight]

TABLE 4-2

|  |  | Example 18 | Comparative Example 6 | Example 19 | Comparative Example 7 | Example 20 | Comparative Example 8 | Example 21 | Comparative Example 9 |
|---|---|---|---|---|---|---|---|---|---|
| Acrylic Monomer | Compound 2, n = 2, PLACCEL FM-2D | 20 |  | 20 |  | 20 |  | 20 |  |
| Copolymerizable | n-Butyl Acrylate |  | 20 |  | 20 |  | 20 |  | 20 |

TABLE 4-2-continued

|  |  | Example 18 | Comparative Example 6 | Example 19 | Comparative Example 7 | Example 20 | Comparative Example 8 | Example 21 | Comparative Example 9 |
|---|---|---|---|---|---|---|---|---|---|
| Monomer | Tetrahydrofurfuryl Acrylate | 30 | 30 | 30 | 30 | 30 | 30 | 30 | 30 |
| Compound Containing an Epoxy Group | EPICOAT 828 | 50 | 50 |  |  |  |  |  |  |
|  | RIKARESIN BEO-60E |  |  |  |  |  |  |  |  |
|  | ADEKARESIN EP-4901 |  |  | 50 | 50 |  |  |  |  |
|  | ADEKARESIN EP-4080 |  |  |  |  | 50 | 50 |  |  |
|  | SELOKISAIDO 2081 (Alicyclic) |  |  |  |  |  |  | 50 | 50 |
| Radical Photoinitiator | IRGACURE 1700 | 0.1 | 0.1 | 0.1 | 0.1 | 0.1 | 0.1 | 0.1 | 0.1 |
| Cationic Photoinitiator | OPTOMER SP-170 | 0.5 | 0.5 | 0.5 | 0.5 | 0.5 | 0.5 | 0.5 | 0.5 |
| SUS Overlap shear Strength (kgf/cm$^2$) |  | 60 | 25 | 70 | 32 | 95 | 25 | 75 | 30 |
| Complete Finish Time of Curing (Hours) |  | 24 | 48 | 24 | 36 | 24 | 36 | 12 | 24 |

[All Mixing Proportions are indicated by Parts by Weight]

TABLE 5

|  |  | Example | | | | | | | Comparative Example |
|---|---|---|---|---|---|---|---|---|---|
|  |  | 22 | 23 | 24 | 25 | 26 | 27 | 28 | 10 |
| Acrylic Monomer | 4-Hydroxybutyl | 20 |  |  |  |  |  |  |  |
|  | 2MHP* |  | 20 |  |  |  |  |  |  |
|  | Compound 2, n = 1, PLACCEL FM-1D |  |  | 20 |  |  |  |  |  |
|  | Compound 2, n = 2, PLACCEL FM-2D |  |  |  | 20 |  |  | 50 |  |
|  | Compound 2, n = 5, PLACCEL FM-5D |  |  |  |  | 20 |  |  |  |
|  | Compound 6, n = 9, BLENMER PP-500 |  |  |  |  |  | 20 |  |  |
| Copolymerizable Monomer | Tetrahydrofurfuryl Acrylate | 30 | 30 | 30 | 30 | 30 | 30 |  | 50 |
| Compound Containing an Epoxy Group | EPICOAT 828 | 30 | 30 | 30 | 30 | 30 | 30 | 30 | 30 |
|  | RIKARESIN BEO-60E | 20 | 20 | 20 | 20 | 20 | 20 | 20 | 20 |
| Radical Photoinitiator | IRGACURE 1700 | 0.1 | 0.1 | 0.1 | 0.1 | 0.1 | 0.1 | 0.1 | 0.1 |
| Cationic Photoinitiator | OPTOMER SP-170 | 0.5 | 0.5 | 0.5 | 0.5 | 0.5 | 0.5 | 0.5 | 0.5 |
| SUS Overlap Shear Strength (kgf/cm$^2$) |  | 65 | 40 | 75 | 95 | 70 | 80 | 90 | 38 |
| Complete Finish Time of Curing (Hours) |  | 12 | 24 | 12 | 36 | 24 | 24 | 24 | 48 |

[* . . . 2-Methacryloyloxyethyl-2-Hydroxypropyl Phthalate]
[All Mixing Proportions are indicated by Parts by Weight]

What is claimed is:

1. A sheet-form, curable pressure-sensitive adhesive comprising a composition including:
   (A) an acrylic polymer having a weight average molecular weight in the range from several tens of thousands to 5 million;
   (B) a photopolymerizable compound containing an epoxy group the compound not being cured; and
   (C) a cationic polymerization initiator which, when a light is irradiated, initiates the compound (B) to undergo a ring-opening polymerization to cure the adhesive.

2. The sheet-form, curable pressure-sensitive adhesive in accordance with claim 1, wherein said composition comprises 100 parts by weight of an acrylic polymer (A), 1–10000 parts by weight of the compound (B) and 0.01–1000 parts by weight of the polymerization initiator (C).

3. The sheet-form, curable pressure-sensitive adhesive in accordance with claim 1, wherein the acrylic polymer (A) is a copolymer obtainable by copolymerizing a compound (a) containing at least one (meth)acryloyl group and at least one hydroxyl group per molecule with a copolymerizable monomer (b) which is copolymerizable with the compound (a) a weight ratio of the compound (a) to the copolymerizable monomer being in the range of 10:30 to 60:30.

4. The sheet-form, curable pressure-sensitive adhesive in accordance with claim 3, wherein said compound (a) is at least one selected from the group consisting of the following compounds (1) through (10):

$CH_2=CH.C(O)O.CH_2CH_2O.[C(O)CH_2CH_2CH_2CH_2CH_2O]n.H$ (n=1–10)      [Compound 1]

$CH_2=C(CH_3).C(O)O.CH_2CH_2O.[C(O)CH_2CH_2CH_2CH_2CH_2O]n.H$ (n=1–10)      [Compound 2]

$CH_2=CH.C(O)O.(CH_2CH_2O)n.H$ (n=1–12)      [Compound 3]

$CH_2=C(CH_3).C(O)O.(CH_2CH_2O)n.H$ (n=1–12)      [Compound 4]

$CH_2=CH.C(O)O.[CH_2CH(CH_3)O]n.H$ (n=1–12)      [Compound 5]

$CH_2=C(CH_3).C(O)O.[CH_2CH(CH_3)O]n.H$
(n=1–12) [Compound 6]

$CH_2=C(CH_3).C(O)O.(CH_2CH_2O)n.[CH_2CH(CH_3)O]m.H$
(n=1–12, m=1–10) [Compound 7]

$CH_2=CH.C(O)O.(CH_2CH_2O)n.[CH_2CH(CH_3)]m.H$ (n=1–12, m=1–10) [Compound 8]

$CH_2=C(CH_3).C(O)O.(CH_2CH_2O)n.(CH_2CH_2CH_2CH_2O)mH$
(n=1–12, m=1–10) [Compound 9]

$CH_2=CH.C(O)O.(CH_2CH_2O)n.(CH_2CH_2CH_2CH_2O)mH$ (n=1–12, m=1–10) [Compound 10]

5. The sheet-form, curable pressure-sensitive adhesive in accordance with claim 3, wherein said copolymerizable monomer (b) is selected from the group consisting of methyl (meth)acrylate, ethyl (meth)acrylate, cyclohexyl (meth)acrylate, benzyl (meth)acrylate and (meth)acrylic acid ester of alcohols containing a C—O—C ether bond.

6. The sheet-form, curable pressure-sensitive adhesive in accordance with any one of the preceding claims 1 and 2–5, wherein said polymerization initiator (C) is cationic photopolymerization initiator.

7. The sheet-form, curable pressure-sensitive adhesive in accordance with claim 6, wherein said cationic photopolymerization initiator is an onium salt compound.

8. The sheet-form, curable pressure-sensitive adhesive in accordance with any one of the preceding claims 1 and 2–7, wherein said composition further comprises a vinyl ether compound.

9. The sheet-form, curable pressure-sensitive adhesive in accordance with claim 8, said composition includes 1–30 parts by weight of the vinyl ether compound relative to 30–70 parts by weight of the compound (B).

10. A curable pressure-sensitive adhesive sheet comprising:

a substrate; and a sheet-form, curable pressure-sensitive adhesive in accordance with claim 1 which is laminated onto at least one surface of said substrate.

11. An energy polymerizable composition which is pressure-sensitive in its ordinary state and is capable of being cured upon application of an activation energy thereto, said composition comprising:

(A) an acrylic polymer having a weight average molecular weight in the range from several tens of thousands to 5 million;

(B) a photopolymerizable compound containing an epoxy group the compound not being cured; and (C) a cationic polymerization initiator which, when a light is irradiated, initiates the compound (B) to undergo a ring-opening polymerization to cure the adhesive.

* * * * *